United States Patent
Dang et al.

(10) Patent No.: US 12,353,889 B2
(45) Date of Patent: Jul. 8, 2025

(54) SWITCHING METHOD FOR SUPPORTING DIFFERENT OPERATING SYSTEMS BY APPLICATION FUNCTION AND STORAGE MEDIUM

(71) Applicants: Chongqing BOE Optoelectronics Technology Co., Ltd., Chongqing (CN); BOE Technology Group Co., Ltd., Beijing (CN)

(72) Inventors: Kangpeng Dang, Beijing (CN); Cheng Zuo, Beijing (CN); Hong Chen, Beijing (CN); Yuansheng Tang, Beijing (CN); Hebing Xu, Beijing (CN); Bo Wang, Beijing (CN); Xingyu Pu, Beijing (CN); Xiong Guo, Beijing (CN); Zhongli Luo, Beijing (CN); Ming Gao, Beijing (CN); Kuan Li, Beijing (CN); Dayu Zhang, Beijing (CN)

(73) Assignees: Chongqing BOE Optoelectronics Technology Co., Ltd., Chongqing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/272,572

(22) PCT Filed: Nov. 29, 2021

(86) PCT No.: PCT/CN2021/134162
§ 371 (c)(1),
(2) Date: Jul. 15, 2023

(87) PCT Pub. No.: WO2023/092603
PCT Pub. Date: Jun. 1, 2023

(65) Prior Publication Data
US 2024/0354116 A1     Oct. 24, 2024

(51) Int. Cl.
*G06F 9/00*      (2018.01)
*G06F 9/4401*    (2018.01)

(52) U.S. Cl.
CPC .................................... *G06F 9/441* (2013.01)

(58) Field of Classification Search
CPC ........... G06F 9/441; G06F 9/445; G06F 13/38
See application file for complete search history.

(56) References Cited

U.S. PATENT DOCUMENTS

| | | | |
|---|---|---|---|
| 10,552,168 B2 * | 2/2020 | Huntley | G06F 21/57 |
| 12,067,275 B1 * | 8/2024 | Nassar | G06F 3/0679 |

(Continued)

FOREIGN PATENT DOCUMENTS

| | | |
|---|---|---|
| CN | 1493963 A | 5/2004 |
| CN | 103376902 A | 10/2013 |

(Continued)

*Primary Examiner* — Nitin C Patel
(74) *Attorney, Agent, or Firm* — IPro, PLLC

(57) ABSTRACT

Provided is a switching method for supporting different operating systems by an application function, including: establishing a one-to-one mapping relationship table between switching setting signals and unique switching setting codes, wherein the application function in the different operating systems corresponds to the different unique switching setting codes, and the unique switching setting codes are capable of uniquely identifying and activating the application function supported by the different operating systems; detecting the switching setting signal output by the operating system; and switching an operating system of a device to the operating system corresponding to the switching setting signal, wherein the device is configured with the application function and supports the different operating systems.

20 Claims, 6 Drawing Sheets

(56) References Cited

U.S. PATENT DOCUMENTS

2010/0005213 A1* 1/2010 Butter ................ G06F 13/4031
710/309
2010/0318695 A1 12/2010 Xing et al.

FOREIGN PATENT DOCUMENTS

CN 107783793 A 3/2018
TW 200828080 A 7/2008

* cited by examiner

SWITCHING METHOD FOR SUPPORTING DIFFERENT OPERATING SYSTEMS BY APPLICATION FUNCTION AND STORAGE MEDIUM

This application is a U.S. national stage of international application No. PCT/CN2021/134162, filed on Nov. 29, 2021, the disclosure of which is herein incorporated by reference in its entirety.

TECHNICAL FIELD

The present disclosure belongs to the technical field of display and particularly relate to a switching method for supporting different operating systems by an application function and a storage medium.

BACKGROUND

At present, the main notebook (NB) systems on the market are the Windows system and the Google system, and a touch function has partially different behaviors and specifications for the two systems. When the existing firmware architecture of the touch function supports different systems, the NB panel needs to be reworked FW, which causes the product quality problem or even the batch return.

SUMMARY

The embodiments of the present disclosure provide a switching method for supporting different operating systems by an application function and a storage medium.

The embodiments of the present disclosure provide a switching method for supporting different operating systems by an application function. The method includes:
establishing a one-to-one mapping relationship table between switching setting signals and unique switching setting codes, wherein the application function in the different operating systems corresponds to the different unique switching setting codes, and the unique switching setting codes are capable of uniquely identifying and activating the application function supported by the different operating systems;
detecting the switching setting signal output by the operating system; and
switching an operating system of a device to the operating system corresponding to the switching setting signal, wherein the device is configured with the application function and supports the different operating systems.

In some embodiments, the unique switching setting code includes a bus address or an identification code.

In some embodiments, the operating systems include a first operating system and a second operating system; the application function in the first operating system and the second operating system corresponds to a first bus address and a second bus address, respectively; and
the switching method includes:
receiving the switching setting signal;
determining whether the switching setting signal is a high-level signal or a low-level signal;
in the case that the switching setting signal is the high-level signal, setting the bus address of the application function in the device as the first bus address to activate the application function in the first operating system; and
in the case that the switching setting signal is the low-level signal, setting the bus address of the application function in the device as the second bus address to activate the application function in the second operating system.

In some embodiments, the switching setting signal is received in the case that the device is powered on; and
the switching method further includes: initializing the device when the device is powered on.

In some embodiments, receiving the switching setting signal includes:
receiving the switching setting signal once at a set time interval, wherein the switching setting signal is received N times in total;
determining whether N/2 or more of the switching setting signals are the same;
in the case that N/2 or more of the switching setting signals are the same, determining the N/2 or more of the switching setting signals as the received switching setting signals; and in the case that less than N/2 of the switching setting signals are the same, determining that no switching setting signal is received,
where N≥6, and N is an integer.

In some embodiments, the method further includes: in a case of determining that no switching setting signal is received, determining a default operating system of the device;
in the case that the default operating system of the device is the first operating system, setting the bus address of the application function in the device as the first bus address to activate the application function in the first operating system; and
in the case that the default operating system of the device is the second operating system, setting the bus address of the application function in the device as the second bus address to activate the application function in the second operating system.

In some embodiments, the operating systems include a first operating system and a second operating system; the application function in the first operating system and the second operating system corresponds to a first bus address and a second bus address, respectively; and
the switching method includes:
receiving the switching setting signal;
determining whether the switching setting signal is a level pulse rising edge signal or a level pulse falling edge signal;
in the case that the switching setting signal is a level pulse rising edge signal, setting a bus address of the application function in the device as the first bus address to activate the application function in the first operating system; and
in the case that the switching setting signal is a level pulse falling edge signal, setting the bus address of the application function in the device as the second bus address to activate the application function in the second operating system.

In some embodiments, the operating systems include a first operating system and a second operating system; the application function in the first operating system and the second operating system corresponds to a first identification code and a second identification code, respectively; and
the switching method includes:
receiving the switching setting signal;
determining whether the switching setting signal is a high-level signal or a low-level signal;
in the case that the switching setting signal is the high-level signal, activating the application function of the first identification code; and in the case that the switching setting signal is the low-level signal, activating the application function of the second identification code.

In some embodiments, the first operating system includes a Windows system; and the second operating system includes a Google system.

In some embodiments, the application function includes a touch function.

In some embodiments, the quantity of the operating systems is three or more, and the application function in the different operating systems corresponds to different bus addresses, respectively; the switching setting signal is set as three or more potential signals with different magnitudes, and the potential signals with different magnitudes correspond to the bus addresses of the application function in the different operating systems one by one respectively; and
the switching method includes:
receiving the switching setting signal;
determining which of the potential signals the switching setting signal is; and
setting, based on a determination result, the bus address of the application function in the device to a bus address corresponding to the potential signal in the mapping relationship table, so as to activate the application function in the operating system corresponding to the bus address.

In some embodiments, the bus addresses include an $I^2C$ bus address.

In some embodiments, the first bus address is 0x10; and the second bus address is 0x40.

The embodiments of the present disclosure further provide a non-transitory storage medium storing a program thereon. The program, when executed, implements the switching method for supporting different operating systems by the application function.

BRIEF DESCRIPTION OF THE DRAWINGS

The accompanying drawings, which are included to provide a further understanding of the embodiments of the present disclosure and constitute a part of the specification, serve to explain the present disclosure together with the embodiments of the present disclosure, and are not to be construed as limiting the present disclosure. The above and other features and advantages will become more apparent to those skilled in the art by describing in detail exemplary embodiments with reference to the accompanying drawings. In the figures.

DETAILED DESCRIPTION

Figure 1:
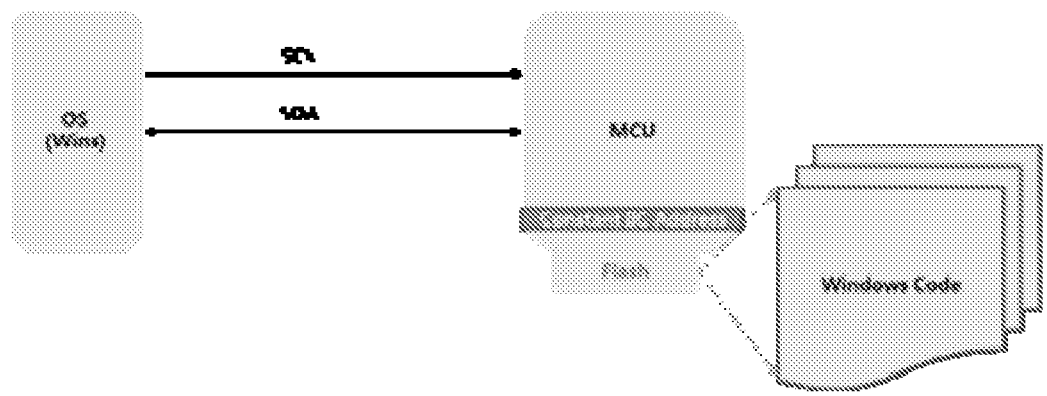
FIG. 1 is a schematic diagram of a Windows system supported by a touch function in an NB product.

In order to make those skilled in the art better understand the technical solutions of the embodiments of the present disclosure, a switching method, a switching module, a storage medium, a device, and a processing system according to the embodiments of the present disclosure are further described in detail below with reference to the accompanying drawings and the detailed description.

The embodiments of the present disclosure will be described more fully hereinafter with reference to the accompanying drawings, but the embodiments shown may be embodied in different forms and should not be construed as limiting the embodiments set forth herein. Rather, these embodiments are provided such that the present disclosure will be thorough and complete, and will fully convey the scope of the present disclosure to those skilled in the art.

The embodiments of the present disclosure are not limited to the embodiments shown in the drawings, but include modifications of configurations formed based on a manufacturing process. Thus, the regions illustrated in the figures have schematic properties, and the shapes of the regions shown in the figures illustrate specific shapes of the regions, but are not intended to be limiting.

Currently, two systems are mainly present at a system for notebook (NB) products with a touch function, namely Windows and Chrome Book. The two systems belong to MS and Google respectively. The behaviors and specifications of the two systems are partially different for a touch function, NB products need to pass the required certification and verification prior to sales, and the verification cycle is long. Moreover, current brand manufacturers may generally sell complete machines supporting the two systems respectively on the basis of one platform, but the following problems exist.

The selling quantity of the complete machines of the two systems is adjusted according to the market in the middle period, such that NB panels which are prepared and subjected to burning and other operations may require rework, which requires manpower to ensure that the touch function correspondingly supports the corresponding systems. Rework requires a lot of offline manpower and consumes time, and meanwhile, product yield loss may be caused. In addition, in the case of offline rework operation, rework missing, rework quality and other problems may occur, and even the risk of batch returns may exist.

Figure 2:
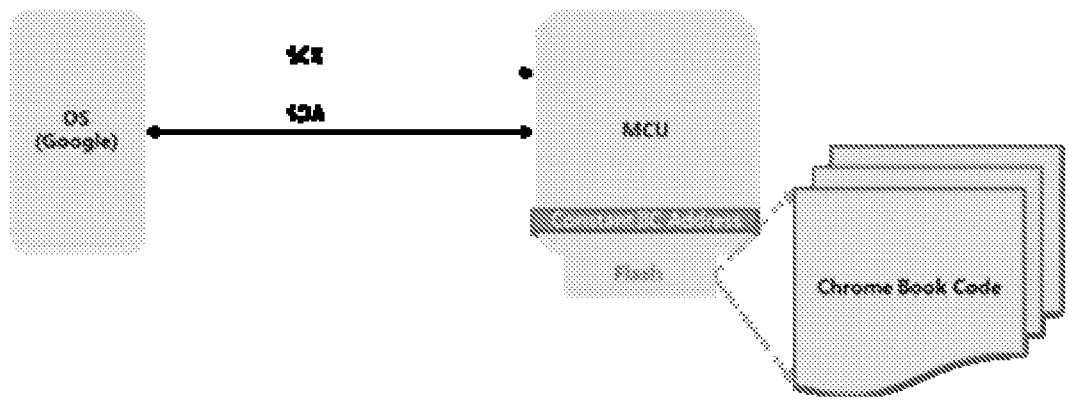
FIG. 2 is a schematic diagram of a Chrome book system supported by a touch function in an NB product.

For the market, customers have the demand of supporting two systems, such as the Windows system (for office) and the Chrome book system (for education), on the same NB product in order to meet more usage scenarios. For the current situation that the touch function in the same NB product supports two systems, reference is made to FIG. 1 and FIG. 2. FIG. 1 is a schematic diagram of a Windows system supported by the touch function in the NB product. FIG. 2 is a schematic diagram of a Chrome book system supported by the touch function in the NB product. In FIG. 1 and FIG. 2, protocol handshake communication between two different operating systems (OS) in the same NB product and a microcontroller unit (MCU) of the NB product is achieved through SCK signals and SDA signals. The touch function in the same NB product has a fixed $I^2C$ bus address in different systems, and $I^2C$ bus addresses in a system supported by factory settings of the NB product and the touch function in the microcontroller unit are correspondingly fixed and may not be changed. In order to switch the touch function in the same NB product between different systems, the touch function needs to be reworked and updated by manpower and may not be compatibly designed, which may cause a lot of waste of manpower, material resources and time.

Figure 3:
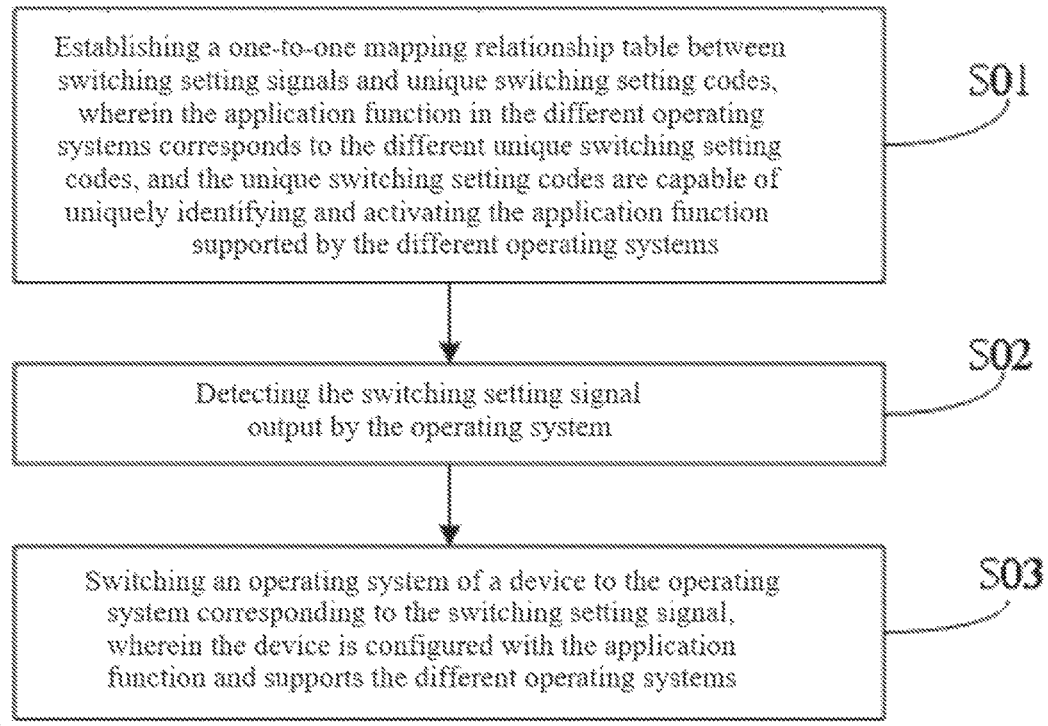
FIG. 3 is a flowchart of a switching method for supporting different operating systems by an application function according to some embodiments of the present disclosure.

In view of the above problems that it needs to be reworked and updated by manpower when the touch function in the same NB product is switched between different systems, and compatibly designed cannot be carried out, in a first aspect, the embodiments of the present disclosure provide a switching method for an application function to support different operating systems. FIG. 3 is a flowchart of the switching method for supporting different operating systems by the application function according to some embodiments of the present disclosure. The method includes: in step S01, a one-to-one mapping relationship table between switching setting signals and unique switching setting codes is established. The application function in the different operating systems corresponds to the different unique switching setting codes. The unique switching setting codes are capable of uniquely identifying and activating the application function supported by the different operating systems.

In step S02, the switching setting signal output by the operating system is detected.

In step S03, an operating system of a device is switched to the operating system corresponding to the switching setting signal. The device is configured with the application function, and the device supports the different operating systems.

In some embodiments, the operating systems supported by the same device include a Windows system, a Google system, an Android system, etc. The same device may simultaneously support two or three or more operating systems to meet more usage scenarios of the device.

In some embodiments, the application function includes a touch function, a heating function, a picture processing function, etc. Any one of the application functions supported by the device has different behaviors and specifications in different operating systems, and in the case that the device runs a certain application function, the application function needs to be activated in an operating system actually selected to be applied, such that the normal running of the certain application function in the actually applied operating system is achieved.

By means of the switching method for supporting different operating systems by the application function according to the embodiments of the present disclosure, the application function configured on the device can be flexibly switched between different operating systems supported by the device, such that the application function configured on the same device does not need to be reworked or updated when switched between the different operating systems supported by the same device, the problems of consumption in manpower, material resources and time, product yield loss, rework missing, rework quality, the risk of batch returns and the like caused by reworking and updating are avoided, supporting and switching of the application function configured on the device for a plurality of operating systems are achieved, and the compatibility of the application function configured on the device in the plurality of operating systems is achieved.

In some embodiments, the unique switching setting code includes a bus address.

Figure 4:
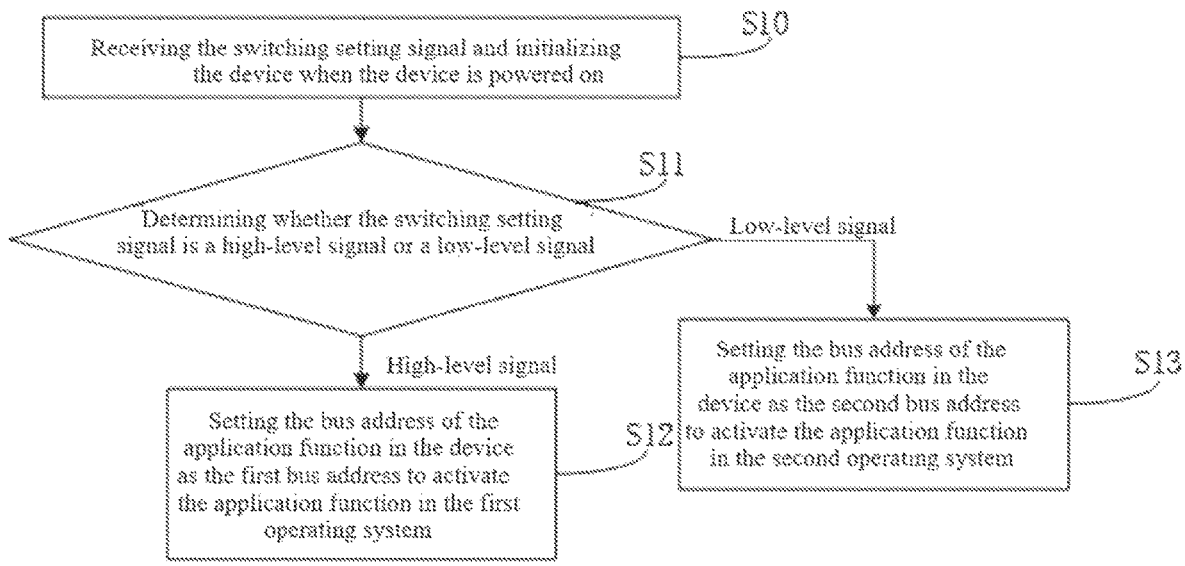
FIG. 4 is a flowchart of a switching method for supporting different operating systems by an application function according to some embodiments of the present disclosure.

In some embodiments, FIG. 4 is a flowchart of the switching method for supporting different operating systems by the application function according to some embodiments of the present disclosure. The operating system includes a first operating system and a second operating system. The application function in the first operating system and the second operating system corresponds to a first bus address and a second bus address, respectively. The switching method includes: in step S10, the switching setting signal is received.

In step S11, whether the switching setting signal is a high-level signal or a low-level signal is determined.

In the case that the switching setting signal is the high-level signal, step S12 is performed: the bus address of the application function in the device is set as the first bus address to activate the application function in the first operating system.

In the case that the switching setting signal is the low-level signal, step S13 is performed: the bus address of the application function in the device is set as the second bus address to activate the application function in the second operating system.

In some embodiments, referring to FIG. 4, in step S10, the switching setting signal is received when the device is powered on. Therefore, the switching setting signal is received more stably, and switching for the application function to support different operating systems is more stable. Step S10 of the switching method further includes: the device is initialized when the device is powered on.

Figure 5:
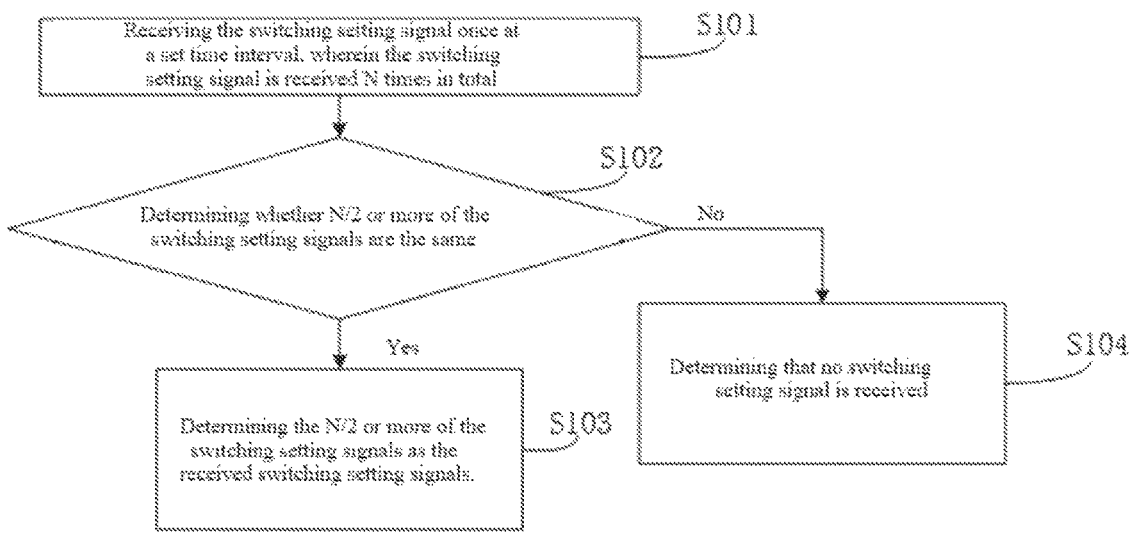
FIG. 5 is a flowchart of receiving switching setting signals.

In some embodiments, FIG. 5 is a flowchart of receiving the switching setting signals. Step S10, namely receiving the switching setting signals, includes: in step S101, the switching setting signal is received once at a set time interval, wherein the switching setting signal is received N times in total.

In step S102, whether N/2 or more of the switching setting signals are the same is determined.

In the case that N/2 or more of the switching setting signals are the same, step S103 is performed: the N/2 or more of the switching setting signals are determined as the received switching setting signals. In the case that less than N/2 of the switching setting signals are the same, step S104 is performed: it is determined that no switching setting signal is received. N≥6, and N is an integer.

The method for receiving the switching setting signals includes: for example, the switching setting signal is scanned every 2 ms within 20 ms, and the switching setting signal is read 10 times in total; in the case of determining that five or more times of the switching setting signals are at the same voltage level, the five or more times of the switching setting signals are determined as the received switching setting signals.

By means of the method for receiving the switching setting signals, the switching setting signals can be received more stably and reliably, it is ensured that the switching setting signals cannot be received by mistake, the accuracy of the received switching setting signals is ensured, and thus misoperation of the switching method for supporting different operating systems by the application function is avoided.

Figure 6:
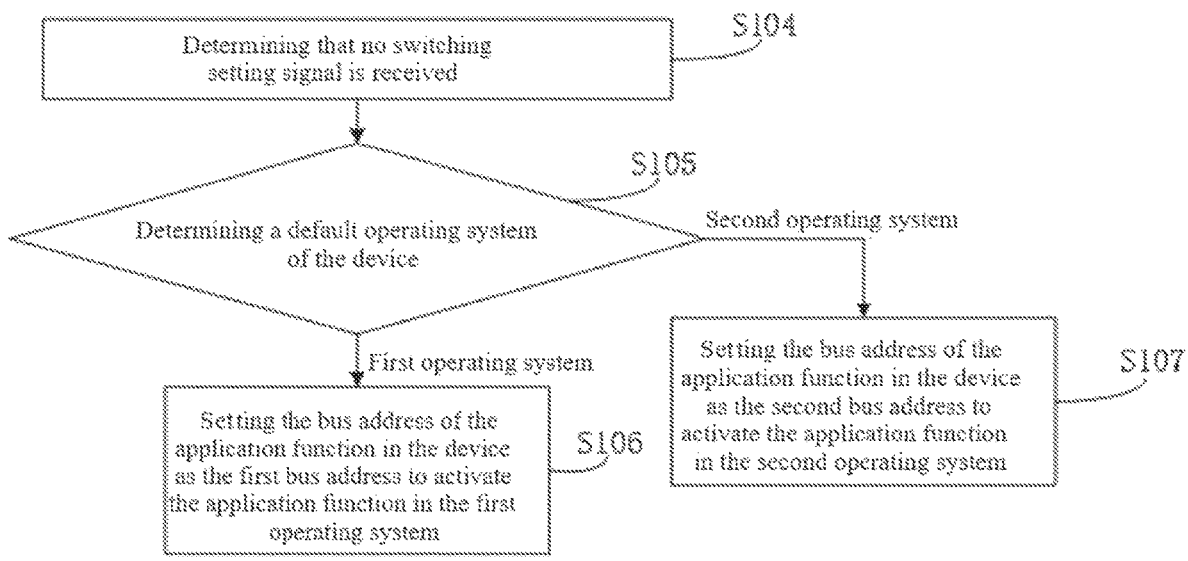
FIG. 6 is a flowchart of activating an application function in different operating systems in the case of determining that no switching setting signal is received.

In some embodiments, FIG. 6 is a flowchart of activating an application function in different operating systems in the case of determining that no switching setting signal is received. The switching method further includes: in the case of determining that no switching setting signal is received in step S104, step S105 is performed: a default operating system of the device is determined.

In the case that the default operating system of the device is the first operating system, step S106 is performed: the bus address of the application function in the device is set as the first bus address to activate the application function in the first operating system.

In the case that the default operating system of the device is the second operating system, step S107 is performed: the bus address of the application function in the device is set as the second bus address to activate the application function in the second operating system.

In some embodiments, the first operating system includes the Windows system; and the second operating system includes the Google system.

In some embodiments, the bus addresses include an I²C bus address. The bus may also be SPI, USB, RS232, etc.

In some embodiments, the first bus address is 0x10; and the second bus address is 0x40.

In the embodiments, referring to Table 1, in the one-to-one mapping relationship table between the switching setting signals and the unique switching setting codes, in the case that a switching setting signal is a high-level signal, the switching setting signal corresponds to the first bus address of the application function, that is, corresponding to 0x10. In the case that a switching setting signal is a low-level signal, the switching setting signal corresponds to the second bus address of the application function, that is, corresponding to 0x40. In the case of determining that the default operating system of the device is the first operating system, a pull-up potential of a receiving end for receiving the switching setting signal in the device is high level, that is, the bus address of the application function in the device is set as the first bus address, such that the application function in the first operating system is activated.

TABLE 1

| switching setting signal output by the operating system | Received switching setting signal | Bus address of the application function for different operating systems |
|---|---|---|
| Low-level signal | Low-level signal | Google system -0x40 |
| High-level signal | High-level signal | Windows system -0x10 |
| No signal | High-level signal (internal pull-up) | |

Figure 7:
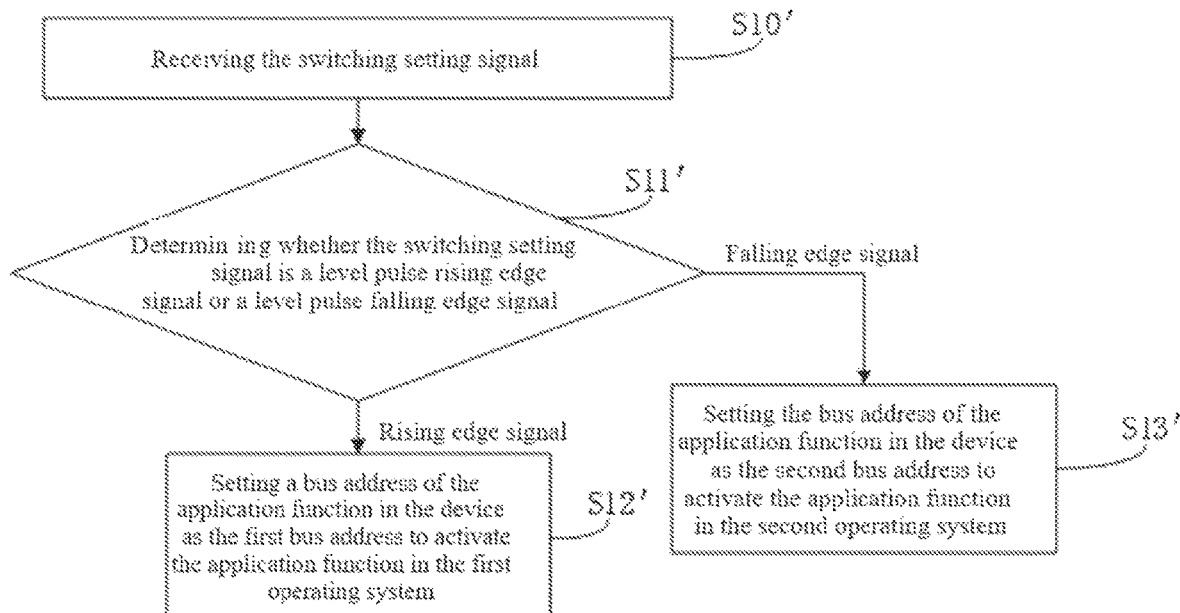
FIG. 7 is a flowchart of another switching method for supporting different operating systems by an application function according to some embodiments of the present disclosure.

In some embodiments, FIG. 7 is a flowchart of another switching method for supporting different operating systems by an application function according to the embodiments of the present disclosure. The operating systems include a first operating system and a second operating system. The application function in the first operating system and the second operating system corresponds to a first bus address and a second bus address, respectively. The switching method includes: in step S10', the switching setting signal is received.

In step S11', whether the switching setting signal is a level pulse rising edge signal or a level pulse falling edge signal is determined.

In the case that the switching setting signal is the level pulse rising edge signal, step S12' is performed: a bus address of the application function in the device is set as the first bus address to activate the application function in the first operating system.

In the case that the switching setting signal is the level pulse falling edge signal, step S13' is performed: the bus address of the application function in the device is set as the second bus address to activate the application function in the second operating system.

Compared with the technical solution that the switching setting signal is the high-level signal or low-level signal, by setting the switching setting signal as the level pulse rising edge signal or level pulse falling edge signal, instantaneous rapid switching of the application function in different operating systems can be achieved, such that the efficiency of the switching method is improved. Meanwhile, through the switching setting signals, the switching method can be carried out at any time, for example, switching can be carried out when the device is powered on or at any time during running of the device, that is, the switching method does not need to be necessarily carried out when the device is powered on.

Figure 8:
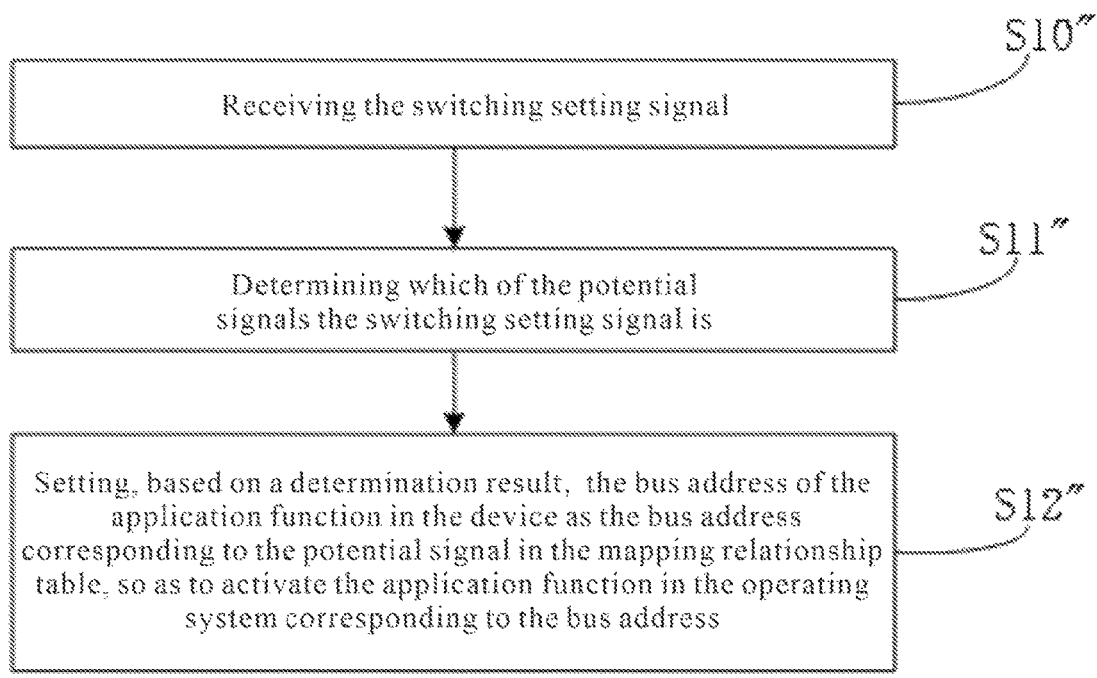
FIG. 8 is a flowchart of still another switching method for supporting different operating systems by an application function according to some embodiments of the present disclosure.

In some embodiments, FIG. 8 is a flowchart of another switching method for an application function to support different operating systems according to the embodiments of the present disclosure. The quantity of the operating systems is three or more, and the application function in the different operating systems corresponds to different bus addresses, respectively. The switching setting signals are set as three or more potential signals with different magnitudes, and the potential signals with different magnitudes correspond to the bus addresses of the application function in the different operating systems one by one respectively. The switching method includes: in step S10", the switching setting signal is received.

In step S11", which of the potential signals the switching setting signal is determined.

In step S12", the bus address of the application function in the device is set, based on a determination result, as the bus address corresponding to the potential signal in the mapping relationship table, so as to activate the application function in the operating system corresponding to the bus address.

By means of the above-mentioned switching method, the application function supports switching of three or more operating systems. For example, the device supports the Windows system, the Google system, and the Android system, and by setting the switching setting signals to three potential signals with different magnitudes, random switching of the same application function between the three operating systems may be achieved.

In some embodiments, in the case that switching of the same application function between a plurality of operating systems is achieved, the switching setting signals may also be set as a plurality of signal combinations formed by permutation and combination of a plurality of potential signals with different magnitudes, where one signal combination corresponds to a bus address of the application function in one operating system, and different signal combinations correspond to bus addresses of the application function in different operating systems. In this case, which signal combination a switching setting signal is may be determined.

In some embodiments, the unique switching setting code includes an identification code. The identification code indicates identification IDs of the same application function in different operating systems, that is, the same application function has different identification IDs in different operating systems, such that selective activation of the same application function in different operating systems is achieved.

Figure 9:
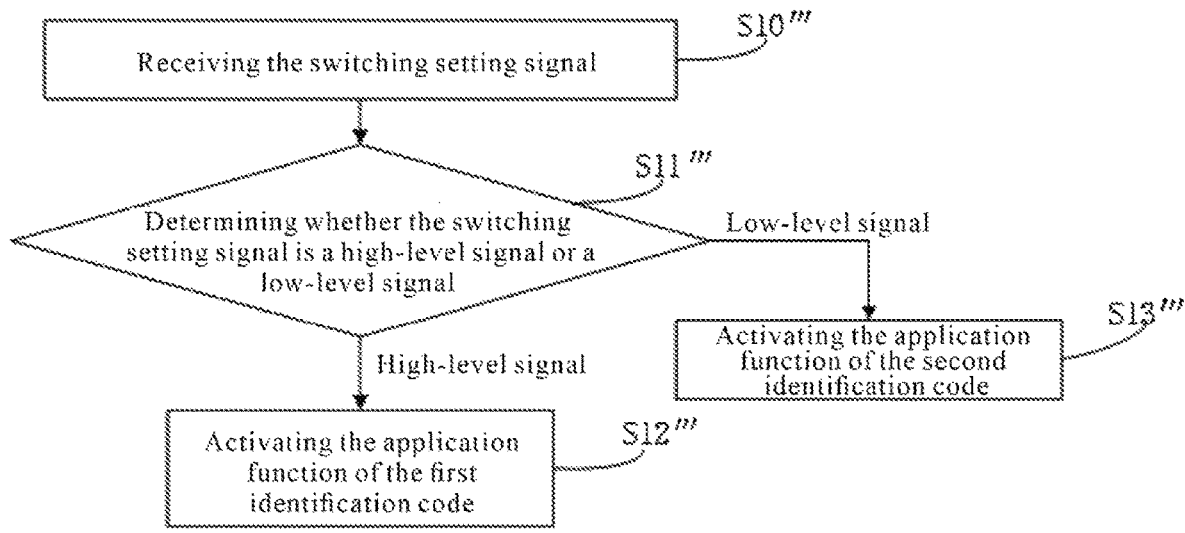
FIG. 9 is a flowchart of still another switching method for supporting different operating systems by an application function according to some embodiments of the present disclosure.

In some embodiments, FIG. 9 is a flowchart of another switching method for supporting different operating systems by an application function according to some embodiments of the present disclosure. The operating system includes a first operating system and a second operating system. The application function in the first operating system and the second operating system corresponds to a first identification code and a second identification code, respectively. The switching method includes: step S10', the switching setting signal is received.

In step S11", whether the switching setting signal is a high-level signal or a low-level signal is determined.

In the case that the switching setting signal is the high-level signal, step S12'" is performed: the application function of the first identification code is activated.

In the case that the switching setting signal is the low-level signal, step S13" is performed: the application function of the second identification code is activated.

By means of the switching method for supporting different operating systems by the application function according to the embodiments of the present disclosure, the application function configured on the device can be flexibly switched between different operating systems supported by the device, such that the application function configured on the same device does not need to be reworked or updated when switched between the different operating systems supported by the same device, the problems of consumption in manpower, material resources and time, product yield loss, rework missing, rework quality, the risk of batch returns and the like caused by reworking and updating are avoided, supporting and switching of the application function configured on the device for a plurality of operating systems are achieved, and the compatibility of the application function configured on the device in the plurality of operating systems is achieved.

In a second aspect, the embodiments of the present disclosure further provide a storage medium storing a program stored thereon. The program, when executed, implements the switching method for supporting different operating systems by the application function as above-mentioned.

Figure 10:
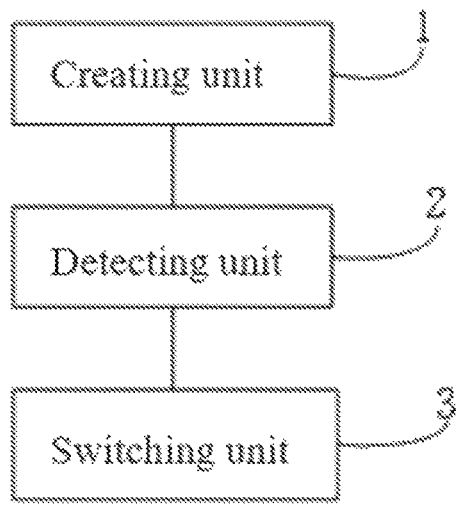
FIG. 10 is a schematic block diagram of a switching module for supporting different operating systems by an application function according to some embodiments of the present disclosure.

In a third aspect, the embodiments of the present disclosure further provide a switching module for supporting different operating systems by an application function. FIG. 10 is a schematic block diagram of the switching module for supporting different operating systems by the application function according to some embodiments of the present disclosure. The switching module includes: a creating unit 1, configured to establish a one-to-one mapping relationship table between switching setting signals and unique switching setting codes, wherein the application function in the different operating systems corresponds to the different unique switching setting codes, and the unique switching setting codes are capable of uniquely identifying and activating the application function supported by the different operating systems; a detecting unit 2, configured to detect the switching setting signal output by the operating system; and a switching unit 3, configured to switch an operating system of a device to the operating systems corresponding to the switching setting signal, wherein the device is configured with the application function, and the device supports the different operating systems.

In a fourth aspect, the embodiments of the present disclosure further provide a device configured with an application function. The device includes a switching module for supporting different operating systems by the application function.

In some embodiments, the device may be any product or component with a display function, such as a laptop, a display, a mobile phone, a tablet computer, a digital photo frame, and a navigator.

According to the device provided by the embodiments of the present disclosure, by adopting the switching module, the application function configured on the device can be flexibly switched between different operating systems supported by the device, such that the application function configured on the same device does not need to be reworked or updated when switched between the different operating systems supported by the same device, the problems of consumption in manpower, material resources and time, product yield loss, rework missing, rework quality, the risk of batch returns and the like caused by reworking and updating are avoided, supporting and switching of the application function configured on the device for a plurality of operating systems are achieved, and the compatibility of the application function configured on the device in the plurality of operating systems is achieved.

Figure 11:
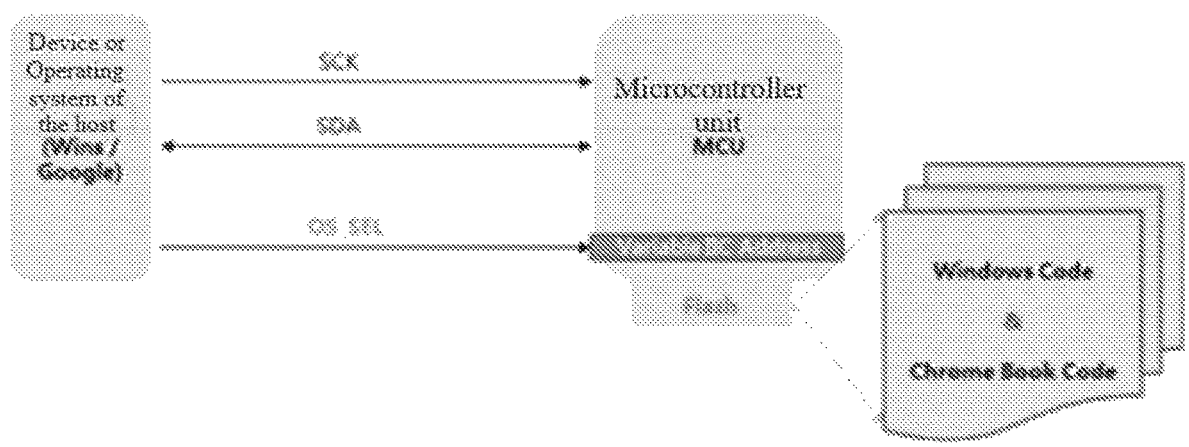
FIG. 11 is a schematic diagram of a processing system according to some embodiments of the present disclosure.

In a fifth aspect, the embodiments of the present disclosure further provide a processing system. FIG. 11 is a schematic diagram of the processing system according to the embodiments of the present disclosure. The processing system includes the above-mentioned device. An operating system of the device is configured to receive a switching request and send a switching setting signal to the switching module of the device.

In some embodiments, the switching module of the device is a microcontroller unit (MCU) of the device, for example, the operating system of the device sends the switching setting signal (e.g., level trigger signal, level pulse rising edge signal, level pulse falling edge signal, potential signals with different magnitudes, or signal combinations formed by permutation and combination of potential signals with different magnitudes) to the microcontroller unit through an OS_SEL signal line. The microcontroller unit finds a corresponding unique switching setting code (e.g., a bus address or an identification code) in the mapping relationship table based on the received switching setting signals. The microcontroller unit then identifies and activates an application function supported by the corresponding operating system based on the unique switching setting code, for example, the microcontroller unit selects and switches to a bus address of the application function supported by the corresponding operating system. Upon being activated, the application function configured on the device supports the newly switched operating system, and the newly switched operating system runs the application function, that is, runs a program code (such as Windows code & Chrome Book code) of the application function. Protocol handshake communication between the operating system and the microcontroller unit (MCU) of the device is achieved through SCK signals and SDA signals.

In some embodiments, the device automatically refreshes a basic input/output system (Bios) between the operating system and the microcontroller unit thereof, such that setting of switching setting signals on the OS_SEL signal line is achieved, supporting and switching of the same application function configured on the device for a plurality of different operating systems are achieved, the problem that at present, batch rework is required for the device to switch different operating systems supported by the same application function is solved, and meanwhile, the requirement that the device supports a plurality of operating systems is met.

In some embodiments, the first operating system and the second operating system support: an HID over $I^2C$ protocol, that is, the Windows system and the Google system use the above protocol. The touch function has different bus addresses (i.e., $I^2C$ slave addresses) in the Windows system and the Google system. For the Windows system, the bus address used by the touch function is 0x10. For the Google system, the touch function may use a bus address not occupied by other manufacturers, for example, the bus address of 0x40 or other unoccupied bus addresses may be selected.

Table 2 shows an address allocation of the device configured with the touch function for the Windows system and the Google system.

TABLE 2

|  | Windows system | Google system | |
|---|---|---|---|
| Host interface | HID over $I^2C$ | HID over $I^2C$ | |
| HID descriptor hosting address | 0x0001 | 0x0001 | |
| Bus address of the application function | 0b_0010_000x (0x10-7 bits) | 0b_0010_000x (0x40-7 bits) | x = 1: Read<br>x = 0: Write |
| Authentication correlation | WHLK | Google AVL | |

In some embodiments, referring to FIG. 11, the processing system further includes a host configured to receive a switching request sent by the device and send a switching setting signal to the switching module of the device. An operating system of the host sends the switching setting signal to the switching module of the device. The switching module of the device may be a microcontroller unit (MCU) of the device, and the operating system of the host sends the switching setting signal to the microcontroller unit of the device via an OS_SEL signal line. By means of the host, online refreshing of the operating system on batch devices may be achieved, such that refreshing efficiency is improved.

According to the processing system provided by the embodiments of the present disclosure, by adopting the device, the device can automatically refresh the basic input/output system (Bios) between the operating system and the microcontroller unit thereof, and moreover, the operating system of the host can refresh batch devices online, such that setting of the switching setting signals on the OS_SEL signal line is achieved, supporting and switching of the same application function configured on the device for a plurality of different operating systems are achieved, and meanwhile, the refreshing efficiency is improved.

It may be understood that the above embodiments are merely exemplary embodiments employed to illustrate the principles of the present disclosure, and the present disclosure is not limited thereto. It will be apparent to those of ordinary skill in the art that various changes and modifications can be made without departing from the spirit and scope of the present disclosure, and these changes and modifications are also considered to fall within the scope of the present disclosure.

What is claimed is:

1. A switching method for supporting different operating systems by an application function, applicable to a device that is configured with the application function and supports the different operating systems, the method comprising:

establishing a one-to-one mapping relationship table between switching setting signals and unique switching setting codes, wherein the application function in the different operating systems corresponds to different unique switching setting codes, and the unique switching setting codes are capable of uniquely identifying and activating the application function supported by the different operating systems;

detecting a switching setting signal output by a current operating system of the device; and switching the current operating system of the device to an operating system corresponding to the switching setting signal, wherein the device is configured with the application function and supports the different operating systems.

2. The switching method according to claim 1, wherein each of the unique switching setting codes comprises a bus address or an identification code.

3. The switching method according to claim 2, wherein the different operating systems comprise a first operating system and a second operating system; the application function in the first operating system and the second operating system corresponds to a first bus address and a second bus address, respectively; and the switching method comprises:

receiving the switching setting signal;

determining whether the switching setting signal is a high-level signal or a low-level signal;

in a case that the switching setting signal is the high-level signal, setting the bus address of the application function in the device as the first bus address to activate the application function in the first operating system; and in a case where the switching setting signal is the low-level signal, setting the bus address of the application function in the device as the second bus address to activate the application function in the second operating system.

4. The switching method according to claim 3, wherein the switching setting signal is received in a case that the device is powered on; and the switching method further comprises: initializing the device when the device is powered on.

5. The switching method according to claim 3, wherein receiving the switching setting signal comprises:

receiving the switching setting signal once at a set time interval, wherein the switching setting signal is received N times in total;

determining whether N/2 or more of the switching setting signals are the same;

in a case that N/2 or more of the switching setting signals are the same, determining the N/2 or more of the switching setting signals as the switching setting signal as received; and in a case that less than N/2 of the switching setting signals are the same, determining that no switching setting signal is received, wherein N≥6, and N is an integer.

6. The switching method according to claim 5, further comprising: in a case of determining that no switching setting signal is received, determining a default operating system of the device;

in a case that the default operating system of the device is the first operating system, setting the bus address of the application function in the device as the first bus address to activate the application function in the first operating system; and in a case where the default operating system of the device is the second operating system, setting the bus address of the application function in the device as the second bus address to activate the application function in the second operating system.

7. The switching method according to claim 2, wherein the different operating systems comprise a first operating system and a second operating system; the application function in the first operating system and the second operating system corresponds to a first bus address and a second bus address, respectively; and the switching method comprises:

receiving the switching setting signal;

determining whether the switching setting signal is a level pulse rising edge signal or a level pulse falling edge signal;

in a case that the switching setting signal is a level pulse rising edge signal, setting a bus address of the application function in the device as the first bus address to activate the application function in the first operating system; and in a case that the switching setting signal is a level pulse falling edge signal, setting the bus address of the application function in the device as the second bus address to activate the application function in the second operating system.

8. The switching method according to claim 2, wherein the different operating systems comprise a first operating system and a second operating system; the application function in the first operating system and the second operating system corresponds to a first identification code and a second identification code, respectively; and the switching method comprises:

receiving the switching setting signal;

determining whether the switching setting signal is a high-level signal or a low-level signal;

in a case that the switching setting signal is the high-level signal, activating the application function of the first identification code; and in a case that the switching setting signal is the low-level signal, activating the application function of the second identification code.

9. The switching method according to claim 3, wherein the first operating system comprises a Windows system; and the second operating system comprises a Google system.

10. The switching method according to claim 3, wherein the application function comprises a touch function.

11. The switching method according to claim 2, wherein the quantity of the different operating systems is three or more, and the application function in the different operating systems corresponds to different bus addresses, respectively; the switching setting signal is set as three or more potential signals with different magnitudes, and the potential signals with different magnitudes correspond to the bus addresses of the application function in the different operating systems one by one respectively; and the switching method comprises:

receiving the switching setting signal;

determining which of the potential signals the switching setting signal is; and setting, based on a determination result, the bus address of the application function in the device to a bus address corresponding to the potential signal in the mapping relationship table, so as to activate the application function in an operating system corresponding to the bus address.

12. The switching method according to claim 2, wherein the bus addresses comprise an I2C bus address.

13. The switching method according to claim 3, wherein the first bus address is 0x10; and the second bus address is 0x40.

14. A non-transitory storage medium storing a program thereon, wherein the program, when executed, implements:

establishing a one-to-one mapping relationship table between switching setting signals and unique switching setting codes, wherein an application function in different operating systems corresponds to different unique switching setting codes, and the unique switching setting codes are capable of uniquely identifying and activating the application function supported by the different operating systems;

detecting a switching setting signal output by a current operating system of a device, wherein the device is configured with the application function and supports the different operating systems; and switching the current operating system of the device to an operating system corresponding to the switching setting signal, wherein the device is configured with the application function and supports the different operating systems.

15. The non-transitory storage medium according to claim 14, wherein each of the unique switching setting codes comprises a bus address or an identification code.

16. The non-transitory storage medium according to claim 15, wherein the different operating systems comprise a first operating system and a second operating system; the application function in the first operating system and the second operating system corresponds to a first bus address and a second bus address, respectively; and the program, when executed, implements:

receiving the switching setting signal;

determining whether the switching setting signal is a high-level signal or a low-level signal;

in a case that the switching setting signal is the high-level signal, setting the bus address of the application function in the device as the first bus address to activate the application function in the first operating system; and in a case where the switching setting signal is the low-level signal, setting the bus address of the application function in the device as the second bus address to activate the application function in the second operating system.

17. The non-transitory storage medium according to claim 16, wherein the first operating system comprises a Windows system; and the second operating system comprises a Google system.

18. The non-transitory storage medium according to claim 16, wherein the application function comprises a touch function.

19. The non-transitory storage medium according to claim 15, wherein the bus addresses comprise an I2C bus address.

20. The non-transitory storage medium according to claim 16, wherein the first bus address is 0x10; and the second bus address is 0x40.

* * * * *